US012782577B2

(12) United States Patent
Ollila et al.

(10) Patent No.: US 12,782,577 B2
(45) Date of Patent: Nov. 3, 2026

(54) HYBRID DIRECT AND INDIRECT TIME-OF-FLIGHT IMAGING

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 439 days.

(21) Appl. No.: 18/397,206

(22) Filed: Dec. 27, 2023

(65) Prior Publication Data

US 2025/0216553 A1 Jul. 3, 2025

(51) Int. Cl.

| | |
|---|---|
| ***G01S 17/894*** | (2020.01) |
| ***G01B 11/22*** | (2006.01) |
| ***G01S 7/484*** | (2006.01) |
| ***G01S 7/4865*** | (2020.01) |
| ***G01S 7/4915*** | (2020.01) |

(52) U.S. Cl.

CPC ............ *G01S 17/894* (2020.01); *G01B 11/22* (2013.01); *G01S 7/484* (2013.01); *G01S 7/4865* (2013.01); *G01S 7/4915* (2013.01)

(58) Field of Classification Search

CPC ...... G01S 17/894; G01S 7/484; G01S 7/4865; G01S 7/4915; G01B 11/22

See application file for complete search history.

(56) References Cited

U.S. PATENT DOCUMENTS

| | | | | |
|---|---|---|---|---|
| 10,430,956 | B2 * | 10/2019 | Lee | G01S 17/36 |
| 11,836,938 | B2 * | 12/2023 | Chen | G01S 17/26 |
| 12,618,973 | B2 * | 5/2026 | Mahara | G01S 17/32 |
| 2020/0124726 | A1 * | 4/2020 | Geuens | G01S 7/4863 |
| 2020/0174120 | A1 * | 6/2020 | Steigemann | G01S 17/08 |
| 2021/0166407 | A1 * | 6/2021 | Chen | G06T 7/55 |
| 2021/0223371 | A1 * | 7/2021 | Meynants | G01S 7/4863 |
| 2021/0231808 | A1 * | 7/2021 | Seliuchenko | G01S 17/10 |
| 2022/0113424 | A1 * | 4/2022 | Rochas | H04N 23/56 |
| 2022/0357436 | A1 * | 11/2022 | Mohan | G01S 17/06 |
| 2024/0036208 | A1 * | 2/2024 | Varillon | G01S 17/36 |
| 2024/0406597 | A1 * | 12/2024 | Finkelstein | H04N 25/705 |
| 2025/0028051 | A1 * | 1/2025 | Timmermans | G01S 17/36 |
| 2025/0199181 | A1 * | 6/2025 | Hong | G06T 5/70 |

* cited by examiner

*Primary Examiner* — Fernando Alcon
(74) *Attorney, Agent, or Firm* — Ziegler IP Group, LLC.

(57) ABSTRACT

Disclosed is a depth imaging system with a light source; a depth sensor comprising direct Time-of-Flight (dToF) pixels and indirect Time-of-Flight (iToF) pixels; and processor(s) configured to: employ the light source to emit an intensity-modulated light pulse towards objects in a real-world environment; obtain dToF data indicative of time taken by the intensity-modulated light pulse to reach the dToF pixels after being reflected by the objects; obtain iToF data indicative of phase shifts undergone by the intensity-modulated light pulse upon reaching the iToF pixels after being reflected by the objects; determine optical depths for the dToF pixels; determine optical depths for the iToF pixels; and generate a depth image from the optical depths of the dToF pixels and the optical depths of the iToF pixels.

17 Claims, 5 Drawing Sheets

HYBRID DIRECT AND INDIRECT TIME-OF-FLIGHT IMAGING

TECHNICAL FIELD

The present disclosure relates to depth imaging systems incorporating hybrid direct and indirect time-of-flight imaging. The present disclosure also relates to methods incorporating hybrid direct and indirect time-of-flight imaging.

BACKGROUND

In recent times, there has been an ever-increasing demand for developing depth-sensing equipment and techniques, especially, in case of immersive extended-reality (XR) technologies which are being employed in various fields such as entertainment, training, medical imaging operations, simulators, navigation, and the like. This is due to the fact that depth-based image generation for creating XR environments facilitates users to experience a heightened sense of realism and immersiveness within the XR environments. Existing depth-sensing techniques often rely on direct and indirect time-of-flight (ToF)-based depth measurements.

However, existing depth-sensing equipment and techniques have certain problems associated therewith. Firstly, some existing depth-sensing equipment and techniques often employ direct ToF sensors, for capturing depth information of a real-world environment. However, a spatial resolution provided by a direct ToF sensor is significantly low, due to a relatively larger size of pixels in the direct ToF (dToF) sensor. Resultantly, this reduces an overall image quality of a depth image captured using the direct ToF sensor. Secondly, other existing depth-sensing equipment and techniques often employ indirect ToF (iToF) sensors, for capturing the depth information. However, an inherent drawback of using the indirect ToF sensors lies in its increased power consumption arising from a necessity to employ multiple frequencies, in order to mitigate depth-sensing range ambiguity. A typical usage of three frequencies (wherein each frequency having four phases) gives rise to several technical challenges. For example, the increased power consumption results in increased heat generation and a decline in a power output of vertical-cavity surface-emitting lasers (VCSELs) that are used in the indirect ToF sensors. Furthermore, the indirect ToF sensors often operate above predefined eye-safety limits. Employing the multiple frequencies also results in reduced frame rates, increased motion artifacts, and increased processing requirements.

Therefore, in light of the foregoing discussion, there exists a need to overcome the aforementioned drawbacks.

SUMMARY

The present disclosure seeks to provide a depth imaging system and a method to generate high-quality, high-resolution, accurate depth images, in computationally-efficient and time-efficient manner. The aim of the present disclosure is achieved by a depth imaging system and a method which incorporate hybrid direct and indirect time-of-flight imaging, namely by using a same depth sensor comprising direct Time-of-Flight (dToF) pixels and indirect Time-of-Flight (iToF) pixels, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 4B illustrates how direct Time-of-Flight (dToF) data and indirect Time-of-Flight (iToF) data corresponding to the depth image are obtained from the depth sensor, while

DETAILED DESCRIPTION OF EMBODIMENTS

Figure 1:
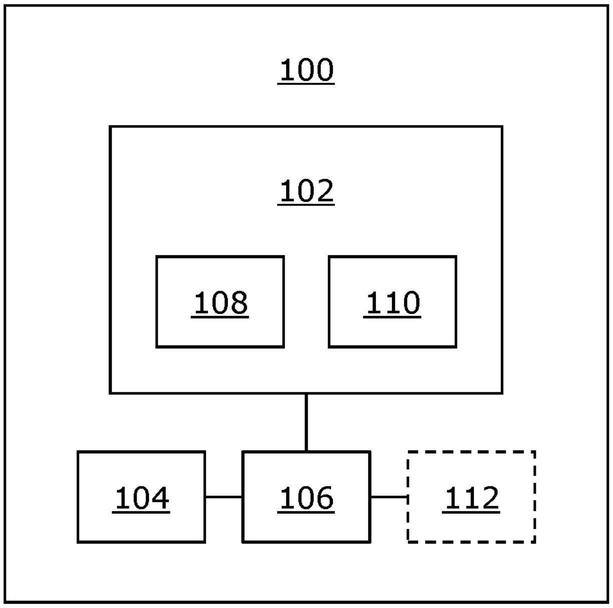
FIG. 1 illustrates a block diagram of an architecture of a depth imaging system incorporating hybrid direct and indirect time-of-flight imaging, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a depth imaging system comprising:

- a light source;
- a depth sensor comprising direct Time-of-Flight (dToF) pixels and indirect Time-of-Flight (iToF) pixels, wherein the dToF pixels and the iToF pixels are arranged in an interleaved manner across a photo-sensitive surface of the depth sensor; and
- at least one processor configured to:
  - employ the light source to emit an intensity-modulated light pulse towards objects in a real-world environment;
  - obtain dToF data indicative of time taken by the intensity-modulated light pulse to reach the dToF pixels after being reflected by the objects;
  - obtain iToF data indicative of phase shifts undergone by the intensity-modulated light pulse upon reaching the iToF pixels after being reflected by the objects;
  - determine optical depths for the dToF pixels, based on the time taken by the intensity-modulated light pulse;

determine optical depths for the iToF pixels, based on the phase shifts undergone by the intensity-modulated light pulse and the optical depths for the dToF pixels; and generate a depth image from the optical depths of the dToF pixels and the optical depths of the iToF pixels.

In a second aspect, an embodiment of the present disclosure provides a method comprising:

employing a light source to emit an intensity-modulated light pulse towards objects in a real-world environment;

obtaining direct Time-of-Flight (dToF) data indicative of time taken by the intensity-modulated light pulse to reach dToF pixels of a depth sensor after being reflected by the objects, and obtaining indirect Time-of-Flight (iToF) data indicative of phase shifts undergone by the intensity-modulated light pulse upon reaching iToF pixels of the depth sensor after being reflected by the objects, wherein the dToF pixels and the iToF pixels are arranged in an interleaved manner across a photo-sensitive surface of the depth sensor;

determining optical depths for the dToF pixels, based on the time taken by the intensity-modulated light pulse;

determining optical depths for the iToF pixels, based on the phase shifts undergone by the intensity-modulated light pulse and the optical depths for the dToF pixels; and generating a depth image from the optical depths of the dToF pixels and the optical depths of the iToF pixels.

The present disclosure provides the aforementioned depth imaging system and the aforementioned method to generate high-quality depth images by using a same depth sensor comprising the dToF pixels and the iToF pixels, in computationally-efficient and time-efficient manner. Herein, the same depth sensor is employed for obtaining the dToF data (for the dToF pixels) and the iToF data (for the iToF pixels) simultaneously, wherein the optical depths for the iToF pixels are highly accurately determined using the phase shifts and the (determined) optical depths for the dToF pixels even when there is a likelihood of ambiguities in phase-shift measurements in case of using the iToF pixels. Beneficially, this facilitates in generating accurate and realistic depth images, which could beneficially be utilised for creating extended-reality (XR) environments. Moreover, arranging the dToF pixels and the iToF pixels in the aforesaid manner enables the at least one processor to sensibly and accurately capture the dToF data and the iToF data, in order to accurately generate the depth image, without compromising on its image quality. Since a single depth image is acquired in one (intensity-modulated) light pulse emitted by the light source, the depth imaging system and the method are susceptible for generating depth images along with fulfilling other requirements in XR devices, for example, such as high frame-rate requirements. The depth imaging system and the method are simple, robust, fast, reliable, supports real time hybrid direct and indirect ToF imaging using the same depth sensor, and can be implemented with ease. It will be appreciated that in order to achieve the aforementioned technical benefits, the dToF pixels and the iToF pixels of the depth sensor are arranged in the interleaved manner across an entirety of the photo-sensitive surface.

Throughout the present disclosure, the term "light source" refers to a device that is capable of emitting light pulses onto the objects (or their parts) present in the real-world environment. Optionally, the light source is any one of: an infrared (IR) light source, a visible-light source, a hyper-spectral light source. Optionally, the light source comprises a plurality of light-emitting elements. A given light-emitting element could be a laser, a light-emitting diode (LED), a projector, a display, or similar.

The laser may be a vertical-cavity surface-emitting laser (VCSEL), an edge-emitting laser (EEL), or the like. It will be appreciated that the term "intensity-modulated light pulse" refers to a light pulse whose intensity (namely, an amplitude) varies with respect to time, during its emission from the light source. Typically, the intensity-modulated light pulse is required for iToF pixels, for depth sensing in the real-world environment. Techniques and equipment for generating intensity-modulated light pulses are well-known in the art. Hereinafter, the term "intensity-modulated light pulse" may be referred to as "light pulse", for sake of convenience only. The term "object" refers to a physical object or a part of the physical object present in the real-world environment. The object could be a living object (for example, such as a human, a pet, a plant, and the like) or a non-living object (for example, such as a wall, a window, a toy, a poster, a lamp, and the like).

Notably, the at least one processor controls an overall operation of the depth imaging system. The at least one processor is communicably coupled to at least the light source and the depth sensor. Optionally, the at least one processor is implemented a programmable digital signal processor (DSP). Alternatively, optionally, the at least one processor is implemented as a cloud server (namely, a remote server) that provides a cloud computing service.

Throughout the present disclosure, the term "depth sensor" refers to a device that detects light pulses after being reflected by the objects in the real-world environment, at the dToF pixels and the iToF pixels, in order to capture a plurality of depth signals. The plurality of depth signals are electrical signals pertaining to the time taken by the light pulse and the phase shifts undergone by the light pulse. Thus, the plurality of depth signals constitute the dToF data of the dToF pixels and the iToF data of the iToF pixels. Optionally, the depth sensor is a part of a depth camera that is employed to capture depth images. Optionally, the depth camera is implemented as a Time-of-Flight (ToF) camera. Depth sensors and depth cameras are well-known in the art.

The term "direct Time-of-Flight pixel" refers to a pixel of the depth sensor that is capable of capturing time-of-flight information for directly estimating depth information. The term "time-of-flight" refers to time taken by the light pulse to reach a given dToF pixel after being reflected by an object or its part in the real-world environment. It is to be understood that a shorter time-of-flight corresponds to an object (or its part) that is near the depth sensor (namely, the depth camera), whereas a greater time-of-flight corresponds to an object (or its part) that is far from the depth sensor. The term "indirect Time-of-Flight pixel" refers to a pixel of the depth sensor that is capable capturing phase shift information for indirectly estimating depth information. The term "phase shift" refers to a phase difference between the light pulse that is emitted towards the objects and a reflected light pulse that is received at a given sensor upon being reflected off the objects. Typically, a size of the given dToF pixel is greater than a size of a given iToF pixel. In an example, a size of the given dToF pixel (for example, 10 micrometres) may be approximately thrice a size of the given iToF pixel (for example, 3.5 micrometres). Furthermore, the iToF pixels may be suitable for short-range depth sensing applications and for use in indoor environments and environments without direct sunlight on the depth sensor. The dToF pixels are suitable for both short-range and long-range depth sensing applications. The dToF offers faster acquisition rates and an ability to measure multiple echoes of the light pulse, allowing for detection of multiple objects in a return path of the light pulse. The term "direct Time-of-Flight data" refers to data read out by the given dToF pixel, said data comprising information pertaining to the time taken by the light pulse to reach the given dToF pixel upon reflection. The term "indirect Time-of-Flight data" refers to data read out by the given iToF pixel, said data comprising information pertaining to a phase shift undergone by the light pulse upon reaching the given iToF pixel after said reflection. The dToF pixels, the iToF pixels, the time-of-flight, the phase shift, the dToF data, and the iToF data are well-known in the art.

It will be appreciated that when the dToF pixels and the iToF pixels are arranged in the interleaved manner, it means that the dToF pixels and the iToF pixels are alternately arranged across the photo-sensitive surface in a particular manner. In some implementations, interleaving of the dToF pixels and the iToF pixels across the photo-sensitive surface is performed in a row-wise manner. In other implementations, interleaving of the dToF pixels and the iToF pixels across the photo-sensitive surface is performed in a column-wise manner. In yet other implementations, interleaving of the dToF pixels and the iToF pixels across the photo-sensitive surface is performed in a chequered-pattern (namely, a chess board-pattern) manner. Such a chequered-pattern arrangement may facilitate in capturing accurate depth information (and thereby providing an improved resolution) for those objects (or their parts) whose shapes do not conform to a row-wise or column-wise arrangement. These implementations have been illustrated in conjunction with FIGS. 3A, 3B, and 3C, for sake of better understanding and clarity.

Optionally, M consecutive rows or columns of dToF pixels and N consecutive rows or columns of iToF pixels are arranged in an alternating manner, wherein M and N are integers, N being greater than M. In this regard, the dToF pixels and the iToF pixels could be sequentially arranged across the photo-sensitive surface in a row-wise manner or in a column-wise manner. In some implementations, the M consecutive rows of the dToF pixels is horizontally adjacent to the N consecutive rows of iToF pixels. For example, 3 consecutive rows of the iToF pixels and 1 row of the dToF pixels are arranged in the alternating manner. This has been illustrated in conjunction with FIG. 3A, for sake of better understanding and clarity. In other implementations, the M consecutive columns of the dToF pixels is vertically adjacent to the N consecutive columns of iToF pixels. For example, 3 consecutive columns of the iToF pixels and 1 column of the dToF pixels are arranged in the alternating manner. This has been illustrated in conjunction with FIG. 3B, for sake of better understanding and clarity. The technical benefit of arranging the dToF pixels and the iToF pixels in the alternating manner is simple, straightforward, easy to implement (especially, in a case, when there is a significant difference between the size of the given dToF pixel and the size of the given iToF pixel, as discussed earlier), may also allow for achieving an acceptably high image quality in the (generated) depth image. Furthermore, such an arrangement may also facilitate in physical generation of tracks (namely, pathways or channels) on the depth sensor where the dToF pixels and iToF pixels are arranged, and in designing timing simulations of light pulses.

Notably, when the light source emits the light pulse towards the objects (or their parts) in the real-world environment, the light pulse strikes surfaces of the objects, and said surfaces of the objects reflects the light pulse back at the depth sensor. It is to be noted that a single depth image is acquired in one (intensity-modulated) light pulse emitted by the light source. Beneficially, this facilitates in achieving high frame rates of generating depth images, because both the dToF pixels and the iToF pixels are read out simultaneously for generating a same depth image (i.e., the dToF data and the iToF data are obtained by the at least one processor at a same time).

The dToF data is obtained for the dToF pixels, and comprises information pertaining to the time taken by the light pulse (namely, the time-of-flight of the light pulse). The dToF data is served as a basis for determining the optical depths for the dToF pixels, to subsequently generate the depth image. It will be appreciated that some objects (or their parts) in the real-world environment are relatively near the depth sensor (i.e., their optical depths are smaller), as compared to other objects (or their parts) in the real-world environment (whose optical depths are greater). For a given dToF pixel that corresponds to an object (or its part) that is near the depth sensor, time taken by the light pulse to reach the given dToF pixel after being reflected by said object is lesser, as compared to another given dToF pixel that corresponds to another object (or its part) that is far from the depth sensor. Therefore, greater the time taken by the light pulse after being reflected by the given object, greater is the distance of the given object from the depth sensor, and vice versa.

Optionally, when determining an optical depth for the given dToF pixel, the at least one processor is configured to employ at least one first mathematical formula. Optionally, the at least one first mathematical formula is defined in a manner that the optical depth for the given dToF pixel is obtained as a half of a product of the speed of the light pulse and the time taken by the light pulse to reach the given dToF pixel. The speed of the light pulse is generally pre-known, and the information pertaining to the time taken is also known to the at least one processor. It will be appreciated that in case of the dToF pixels, since the time-of-flight and the distance of the given object from the depth sensor are directly related, the optical depths for the dToF pixels determined in the aforesaid manner are highly accurate and realistic. The aforesaid manner of determining the optical depths for the dToF pixels is well-known in the art.

The iToF data is obtained for the iToF pixels, and comprises information pertaining to the phase shifts undergone by the light pulse. The iToF data is served as a basis for determining the optical depths for the iToF pixels, to subsequently generate the depth image. It will be appreciated that for a given iToF pixel that corresponds to a given object (or its part) in the real-world environment, greater the phase shift corresponding to the given iToF pixel, greater is the time taken by the light pulse after being reflected by the given object, and greater is the distance of the given object from the depth sensor, and vice versa. In case of the iToF pixels, the phase shift is typically utilised to infer the distance of the given object indirectly, unlike in case of the dToF pixels wherein the time taken is typically utilised to infer the distance of the given object directly. An iToF pixel utilises at least 2 wells (namely, storage spaces) to measure a phase of the light pulse upon reflection, and based on said phase, it is possible to deduce the distance the light pulse has travelled since its emission.

Optionally, when determining an optical depth for the given iToF pixel, the at least one processor is configured to employ at least one second mathematical formula. Optionally, the at least one second mathematical formula is defined in a manner that the optical depth for the given iToF pixel is obtained as a product of the wavelength of the light pulse and the phase shift corresponding to the given iToF pixel, divided by 4π. The wavelength of the light pulse can be pre-known, for example, when the light source is an IR light source, and the phase shift is also known to the at least one processor. Thus, the optical depth for the given iToF pixel can be easily and accurately determined. The aforesaid manner of determining the optical depths for the iToF pixels (using the phase shifts) is well-known in the art.

Notably, in addition to this, when determining the optical depth for the given iToF pixel, an optical depth for a given dToF pixel is also taken into account. This is because in case of the iToF pixels, there may be a likelihood of ambiguities in phase-shift measurements (for example, any optical distance that is a multiple of the wavelength of the light pulse may result in same phase shifts), which adversely affects an accuracy of determining the optical depths for the iToF pixels. Therefore, said ambiguities can be resolved (namely, minimised) by analysing the optical depths for the dToF pixels (for example, optical depths for neighbouring dToF pixels) when determining the optical depth for the given iToF pixel, as the optical depths for the dToF pixels are highly accurately determined (as discussed earlier). In this manner, the optical depth for the given iToF pixel is determined with a high accuracy, even when said ambiguities are present. There will now be discussed determination of the optical depth for the given iToF pixel in detail.

Optionally, when determining the optical depths for the iToF pixels, the at least one processor is configured to determine an optical depth for a given iToF pixel as an optical depth that is calculated based on a phase shift corresponding to the given iToF pixel and that lies within a predefined percent from an optical depth determined for a neighbouring dToF pixel. In this regard, the optical depth for the given iToF pixel is calculated using the phase shift corresponding to the given iToF pixel in a same manner as discussed earlier. Since there could be ambiguities in the phase-shift measurements, the at least one processor determines whether the (calculated) optical depth for the given iToF pixel lies within the predefined percent. Since the optical depths for the dToF pixels are highly accurately determined, when the (calculated) optical depth for the given iToF pixel lies within the predefined percent, it is highly likely that both the given iToF pixel and the neighbouring dToF pixel correspond to a same object (or its part) in the real-world environment, and thus their respective optical depths would be considerably similar (i.e., would not have a drastic difference therebetween). Beneficially, in such a case, it may be ensured that the optical depth for the given iToF pixel is significantly accurate, even when said ambiguities are present. Otherwise, when the (calculated) optical depth for the given iToF pixel does not lie within the predefined percent, it may be likely that the given iToF pixel and the neighbouring dToF pixel do not correspond to a same object, and that the given iToF pixel and the neighbouring dToF pixel may correspond to different objects lying at different optical depths in the real-world environment. Moreover, in some scenarios, the given iToF pixel may correspond to a portion of a boundary of an object and the neighbouring dToF pixel may correspond to another object, thus optical depths of other neighbouring pixels could also be utilised in order to validate the (calculated) optical depth of the iToF pixel such that it lies within the predefined percent from respective optical depths of at least some of the other neighbouring pixels. Optionally, the predefined percent lies in a range of 5 percent to 15 percent.

Optionally, when determining the optical depth for the given iToF pixel, the at least one processor is configured to:

generate a histogram based on the optical depth determined for the neighbouring dToF pixel; and fit the optical depth that is calculated based on the phase shift corresponding to the given iToF pixel into the histogram.

In this regard, the at least one processor is optionally configured to generate the histogram by binning optical depths determined for neighbouring dToF pixels and counting a frequency of the optical depths within bins. Optionally, when generating the histogram, the at least one processor is configured to utilise light intensity captured by a given neighbouring dToF pixel as a function of time when the light pulse is emitted towards the objects. Generating the histogram based on the optical depths of the dToF pixels is well-known in the art. It will be appreciated that once the histogram is generated, a value of the (calculated) optical depth is adjusted (namely, increased or decreased) in a manner that it fits into the histogram, thereby mitigating said ambiguities. This does not necessarily mean that the value of the (calculated) optical depth is to be exactly same as a value of the optical depth for the neighbouring dToF pixel. The value of the (calculated) optical depth may lie within the predefined percent from the value of the optical depth for the neighbouring dToF pixel. It will also be appreciated that the histogram generated from the optical depths for the neighbouring dToF pixels serves as a reference or a baseline, for aligning/fine-tuning the (calculated) optical depth for the iToF pixel within this histogram accordingly. Beneficially, this enhances the accuracy of determining the optical depths for the iToF pixels, and allows for generating highly-quality depth images.

Optionally, the optical depths for the iToF pixels are determined by using at least one neural network. Optionally, in this regard, an input of the at least one neural network comprises the iToF data indicative of the phase shifts and the optical depths determined for the dToF pixels, while an output of the at least one neural network comprises the optical depths for the iToF pixels. It will be appreciated that the at least one neural network determines the optical depths for the iToF pixels in a highly accurate manner by resolving said ambiguities, as compared to conventional techniques. In this way, the at least one neural network may act as a mapping function, providing refined depth predictions for the iToF pixels. This may enhance overall depth sensing in the real-world environment, and mitigate typical uncertainties involved in optical depth determination for the iToF pixels. It will also be appreciated that the aforesaid input is provided to the at least one neural network both in a training phase of the at least one neural network and in an inference phase of the at least one neural network (i.e., when the at least one neural is utilised after it has been trained).

Notably, once the optical depths of the dToF pixels and the optical depths of the iToF pixels are determined, the at least one processor is configured to generate a given depth image. Techniques/algorithms for generating depth images from optical depths are well-known in the art. Throughout the present disclosure, the term "depth image" refers to an image comprising information pertaining to optical depths of the objects (or their parts) present in the real-world environment. In other words, a given depth image provides information pertaining to distances (namely, the optical depths) of surfaces of the objects (or their parts) from a given viewpoint and a given viewing direction of the depth sensor capturing the given depth image. In an example, the given depth image could be an image comprising a plurality of pixels, wherein a pixel value of each pixel in said depth image indicates an optical depth of its corresponding real-world point/region within the real-world environment. Optionally, the given depth image is a depth map, wherein the depth map is a data structure comprising the information pertaining to the optical depths of the objects. It will be appreciated that the depth images generated in this manner could beneficially be utilised for creating extended-reality (XR) environments, to facilitate users to experience a heightened sense of realism and immersiveness within the XR environments. The depth images and depth maps are well-known in the art.

Optionally, the depth imaging system further comprises a wobulator, wherein the at least one processor is configured to:

- employ the light source to emit a next intensity-modulated light pulse towards the objects;
- control the wobulator to perform a pixel shift between the depth image and a next depth image;
- obtain next dToF data indicative of time taken by the next intensity-modulated light pulse to reach the dToF pixels after being reflected by the objects;
- obtain next iToF data indicative of phase shifts undergone by the next intensity-modulated light pulse upon reaching the iToF pixels after being reflected by the objects;
- determine next optical depths for the dToF pixels, based on the time taken by the next intensity-modulated light pulse;
- determine next optical depths for the iToF pixels, based on the phase shifts undergone by the next intensity-modulated light pulse, wherein a next optical depth for a given iToF pixel is determined further based on at least one of: a next optical depth for a neighbouring dToF pixel, an optical depth in said depth image for a corresponding dToF pixel whose field of view overlaps with a field of view of the given iToF pixel; and
- generate the next depth image from the next optical depths of the dToF pixels and the next optical depths of the iToF pixels.

Herein, the term "wobulator" refers to a device that is capable of performing a pixel shift between two consecutive depth images. The term "pixel shift" refers to a pixel-level movement (namely, a pixel-level shifting) of the depth sensor (or light incoming towards the depth sensor) in a particular direction, for capturing a given depth image with the depth sensor. It will be appreciated that the pixel shift could be performed, for example, by physically moving the depth sensor and/or its corresponding optics (which may comprise optical elements, for example, such as lens, mirrors, and the like) by a step size in a particular direction, or by optically steering the light (incoming towards the depth sensor) by a step size in a particular direction. The depth sensor and/or the optics could be physically moved (namely, tilted and/or shifted) by the wobulator, for example, by way of using an actuator. In this regard, the wobulator may comprise at least the actuator. The optical steering could, for example, be done by way of using a liquid crystal device, a mems-actuated soft polymer, a micromirror, a lens, a liquid lens, adaptive optics and the like. It will also be appreciated that pixel shifting (namely, wobulation) could be performed by physically moving (in a horizontal direction and/or a vertical direction) or tilting only one optical element of the optics, in addition to physically moving the depth sensor. Alternatively, the pixel shifting could be performed by physically moving or tilting an entirety of the optics, for example, using an electromagnetic actuator (such as a voice coil motor), in addition to physically moving the depth sensor. Wobulators are well-known in the art. Information pertaining to the step size will be explained later.

Optionally, when said pixel shift is performed by the wobulator between the depth image and a next depth image, the depth image (namely, a first depth image or a previously-generated depth image) is captured when the depth sensor is at its actual (namely, original) position (i.e., the depth image is captured when the depth sensor or the light incoming towards the depth sensor has not been shifted yet), and the next depth image (namely, a second depth image) is captured when the depth sensor or the light incoming towards the depth sensor is shifted (i.e., moved) according to said pixel shift. It will be appreciated that when capturing the depth image and the next depth image, it is ensured that either the depth camera (or the depth sensor) is capturing depth images of a static real-world environment (i.e., only stationary objects or their parts are present in the real-world environment), or a change in a relative pose between the depth camera and a given object or its part present in the real-world environment is minimal/negligible. In this way, depth information represented in the depth image and the next depth image would be significantly similar to each other, and thus it would be advantageous to generate the next depth image by utilising the depth image, or to generate a high-resolution depth image.

It will be appreciated that the next depth image is acquired in the next (intensity-modulated) light pulse emitted by the light source. Hereinafter, the term "next intensity-modulated light pulse" may be referred to as "next light pulse", for sake of convenience only. The depth image and the next depth image may be captured at a same frequency that is employed by the light source. Moreover, the next dToF data and the next iToF data are obtained by the at least one processor in a similar manner, as discussed earlier when generating the depth image. The next optical depths for the dToF pixels can be determined in a similar manner, as discussed earlier when generating the depth image.

Furthermore, optionally, the at least one processor is configured to determine the next optical depth for the given iToF pixel as an optical depth that is calculated based on a phase shift (undergone by the next light pulse) corresponding to the given iToF pixel and that optionally, lies within a predefined percent from the next optical depth determined for the neighbouring dToF pixel. The aforesaid determination can be performed in a similar manner, as discussed earlier when generating the depth image. Additionally, optionally, the at least one processor is configured to take into account a value of the optical depth for the corresponding dToF pixel in said depth image (i.e., in the previously-generated depth image), for further refining/adjusting a value of the next optical depth for the given iToF pixel. This is because due to the wobulation (performed in the aforesaid manner), the field of view of the corresponding dToF pixel would overlap with the field of view of the given iToF pixel, and therefore it may be likely both the corresponding dToF pixel and the given iToF pixel correspond to a same object (or its part) in the real-world environment, and thus their respective optical depths would be considerably similar. Beneficially, in this regard, the value of the next optical depth for the given iToF pixel could be adjusted accordingly to lie within the predefined percent from the optical depth for the corresponding dToF pixel. Due to this, it may be ensured that the next optical depth for the given iToF pixel is significantly accurate, even when said ambiguities are present. It is to be understood that said overlap may likely be a partial overlap, considering typical sizes of dToF pixels and iToF pixels. It will be appreciated that the next depth image is generated in a similar manner, as described earlier with respect to the depth image.

Optionally, the at least one processor is configured to utilise the depth image and the next depth image to generate a high-resolution depth image. Optionally, in this regard, when utilising the depth image and the next depth image, the at least one processor is configured to combine a pixel value of a pixel in the depth image with a pixel value of a corresponding pixel in the next depth image, to generate a pixel value of a pixel in the high-resolution depth image. Optionally, when utilising the depth image and the next depth image, the at least one processor is configured to employ a super-resolution algorithm to generate the high-resolution depth image. Super-resolution algorithms are well-known in the art. It will be appreciated that the high-resolution depth image is highly accurate and realistic, and its resolution (for example, such as in terms of pixels per degree (PPD)) may closely match with a resolution of a corresponding colour image that is captured using a visible-light camera from a same viewpoint and a same viewing direction as that of the depth camera. This may, particularly, be beneficial when performing at least one compositing task pertaining to generation of XR images. Optionally, the at least one processor is configured to employ at least one neural network for generating the high-resolution depth image.

Optionally, a step size of the pixel shift is any one of:

(i) a single dToF pixel, (ii) X dToF pixel, wherein X is a fraction that lies between 0 and 1, (iii) Y iToF pixels, wherein Y is an integer that lies in a range from 1 to Z, Z being equal to a number of iToF pixels that lie consecutively along a direction of the pixel shift in the depth sensor, (iv) W iToF pixels, wherein W is a decimal number having a whole number part that lies in a range from 1 to Z, and a decimal part that lies between 0 and 1.

Optionally, when the step size is the single dToF pixel, it means that when performing the pixel shift, the depth sensor or the light incoming towards the depth sensor is shifted along a given direction by an amount defined by the single dToF pixel. This step size may, particularly, be beneficial in a scenario where the field of view of the corresponding dToF pixel is to overlap with the field of view of the given iToF pixel (as discussed earlier). Alternatively, optionally, when the step size is the X dToF pixel wherein X is the fraction that lies between 0 and 1, it means that the step size is a fractional step size, wherein when performing the pixel shift, the depth sensor or the light incoming towards the depth sensor is shifted along a given direction by an amount defined by a fraction of a size of a dToF pixel. The technical benefit of employing such a fractional step size is that it facilitates in providing an apparent spatial super-resolution that is higher than a native resolution of the depth sensor. This is because when the step size is the fraction of the size of the dToF pixel, depth information in pixels of the depth image and the next depth image would be highly comprehensive, and thus depth information of a corresponding pixel in the high-resolution depth image would be highly accurate and realistic. As an example, X may be from 0.15, 0.25, 0.4 or 0.5 up to 0.5, 0.8, or 0.9. Optionally, the step size is 0.5 dToF pixel.

Yet alternatively, optionally, when the step size is the Y iToF pixels, wherein Y is the integer that lies in the range from 1 to Z, it means that the step size is an integer step size, wherein when performing the pixel shift, the depth sensor or the light incoming towards the depth sensor is shifted along a given direction by an amount defined by a size of one or more (full) iToF pixels that lie along the given direction of the pixel shift. Such an integer step size may, particularly, be beneficial in a scenario where the field of view of the corresponding dToF pixel is to overlap with the field of view of the given iToF pixel (as discussed earlier). Still alternatively, optionally, when the step size is the W iToF pixels, wherein W is the decimal number, it means that the step size is a decimal-number step size. In such a case, when performing the pixel shift, the depth sensor or the light incoming towards the depth sensor is shifted along a given direction by an amount defined by a size of one or more (full) iToF pixels and/or a fraction of a size of an iToF pixel that lie along the given direction of the pixel shift. The technical benefit of employing such a decimal-number step size is that it facilitates in providing the apparent spatial super-resolution.

The present disclosure also relates to the method as described above. Various embodiments and variants disclosed above, with respect to the aforementioned depth imaging system, apply mutatis mutandis to the method.

Optionally, in the method, the step of determining the optical depths for the iToF pixels comprises determining an optical depth for a given iToF pixel as an optical depth that is calculated based on a phase shift corresponding to the given iToF pixel and that lies within a predefined percent from an optical depth determined for a neighbouring dToF pixel.

Optionally, in the method, the step of determining the optical depth for the given iToF pixel comprises:

generating a histogram based on the optical depth determined for the neighbouring dToF pixel; and fitting the optical depth that is calculated based on the phase shift corresponding to the given iToF pixel into the histogram.

Optionally, in the method, the step of determining the optical depths for the iToF pixels is performed using at least one neural network.

Optionally, the method further comprises:

employing the light source to emit a next intensity-modulated light pulse towards the objects;

controlling a wobulator to perform a pixel shift between the depth image and a next depth image;

obtaining next dToF data indicative of time taken by the next intensity-modulated light pulse to reach the dToF pixels after being reflected by the objects;

obtaining next iToF data indicative of phase shifts undergone by the next intensity-modulated light pulse upon reaching the iToF pixels after being reflected by the objects;

determining next optical depths for the dToF pixels, based on the time taken by the next intensity-modulated light pulse;

determining next optical depths for the iToF pixels, based on the phase shifts undergone by the next intensity-modulated light pulse, wherein a next optical depth for a given iToF pixel is determined further based on at least one of: a next optical depth for a neighbouring dToF pixel, an optical depth in said depth image for a corresponding dToF pixel whose field of view overlaps with a field of view of the given iToF pixel; and generating the next depth image from the next optical depths of the dToF pixels and the next optical depths of the iToF pixels.

Optionally, the method further comprises utilising the depth image and the next depth image to generate a high-resolution depth image.

Optionally, in the method, a step size of the pixel shift is any one of:

(i) a single dToF pixel, (ii) X dToF pixel, wherein X is a fraction that lies between 0 and 1, (iii) Y iToF pixels, wherein Y is an integer that lies in a range from 1 to Z, Z being equal to a number of iToF pixels that lie consecutively along a direction of the pixel shift in the depth sensor, (iv) W iToF pixels, wherein W is a decimal number having a whole number part that lies in a range from 1 to Z, and a decimal part that lies between 0 and 1.

Optionally, in the method, M consecutive rows or columns of dToF pixels and N consecutive rows or columns of iToF pixels are arranged in an alternating manner, wherein M and N are integers, N being greater than M.

DETAILED DESCRIPTION OF THE DRAWINGS

Referring to FIG. 1, illustrated is a block diagram of an architecture of a depth imaging system 100 incorporating hybrid direct and indirect time-of-flight imaging, in accordance with an embodiment of the present disclosure. The depth imaging system 100 comprises a depth sensor 102, a light source 104, and at least one processor (for example, depicted as a processor 106). The depth sensor 102 comprises direct Time-of-Flight (dToF) pixels 108 and indirect Time-of-Flight (iToF) pixels 110. Optionally, the depth imaging system 100 further comprises a wobulator 112. The processor 106 is communicably coupled to the depth sensor 102, the light source 104, and optionally, to the wobulator 112. The processor 106 is configured to perform various operations, as described earlier with respect to the aforementioned first aspect.

It may be understood by a person skilled in the art that FIG. 1 includes a simplified architecture of the depth imaging system 100, for sake of clarity, which should not unduly limit the scope of the claims herein. It is to be understood that the specific implementation of the depth imaging system 100 is provided as an example and is not to be construed as limiting it to specific numbers or types of depth sensors, light sources, processors, dToF pixels, iToF pixels, and wobulators. The person skilled in the art will recognize many variations, alternatives, and modifications of embodiments of the present disclosure.

Figure 2:
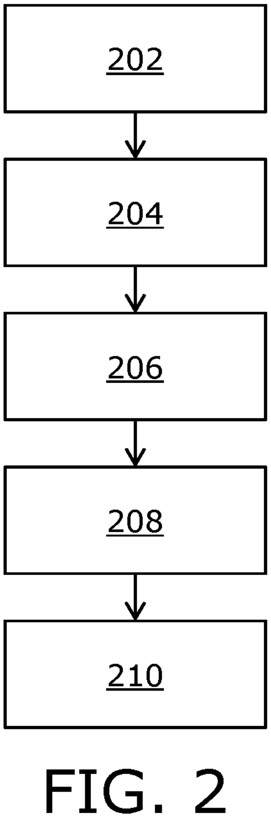
FIG. 2 illustrates steps of a method incorporating hybrid direct and indirect time-of-flight imaging, in accordance with an embodiment of the present disclosure.

Referring to FIG. 2, illustrated are steps of a method incorporating hybrid direct and indirect time-of-flight imaging, in accordance with an embodiment of the present disclosure. At step 202, a light source is employed to emit an intensity-modulated light pulse towards objects in a real-world environment. At step 204, direct Time-of-Flight (dToF) data and indirect Time-of-Flight (iToF) data are obtained, wherein the dToF data is indicative of time taken by the intensity-modulated light pulse to reach dToF pixels of a depth sensor after being reflected by the objects and the iToF data is indicative of phase shifts undergone by the intensity-modulated light pulse upon reaching iToF pixels of the depth sensor after being reflected by the objects, and wherein the dToF pixels and the iToF pixels are arranged in an interleaved manner across a photo-sensitive surface of the depth sensor. At step 206, optical depths are determined for the dToF pixels, based on the time taken by the intensity-modulated light pulse. At step 208, optical depths are determined for the iToF pixels, based on the phase shifts undergone by the intensity-modulated light pulse and the optical depths for the dToF pixels. At step 210, a depth image is generated from the optical depths of the dToF pixels and the optical depths of the iToF pixels.

The aforementioned steps are only illustrative and other alternatives can also be provided where one or more steps are added, one or more steps are removed, or one or more steps are provided in a different sequence without departing from the scope of the claims.

Figure 3A:
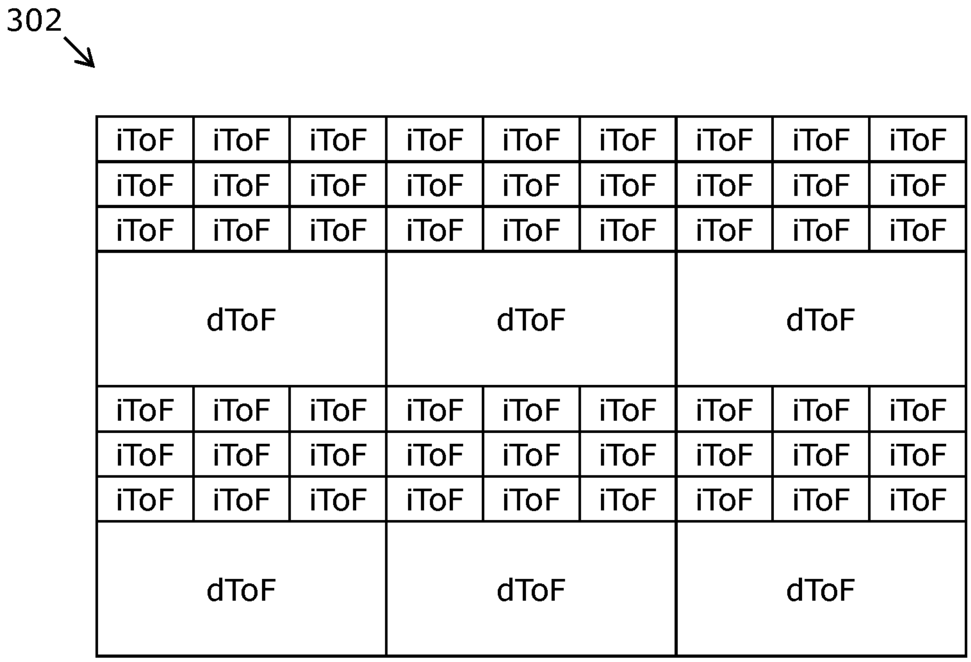
FIGS. 3A, 3B, and 3C illustrate different examples of arranging direct Time-of-Flight (dToF) pixels and indirect Time-of-Flight (iToF) pixels in a depth sensor, in accordance with various embodiments of the present disclosure.
Figure 3B:
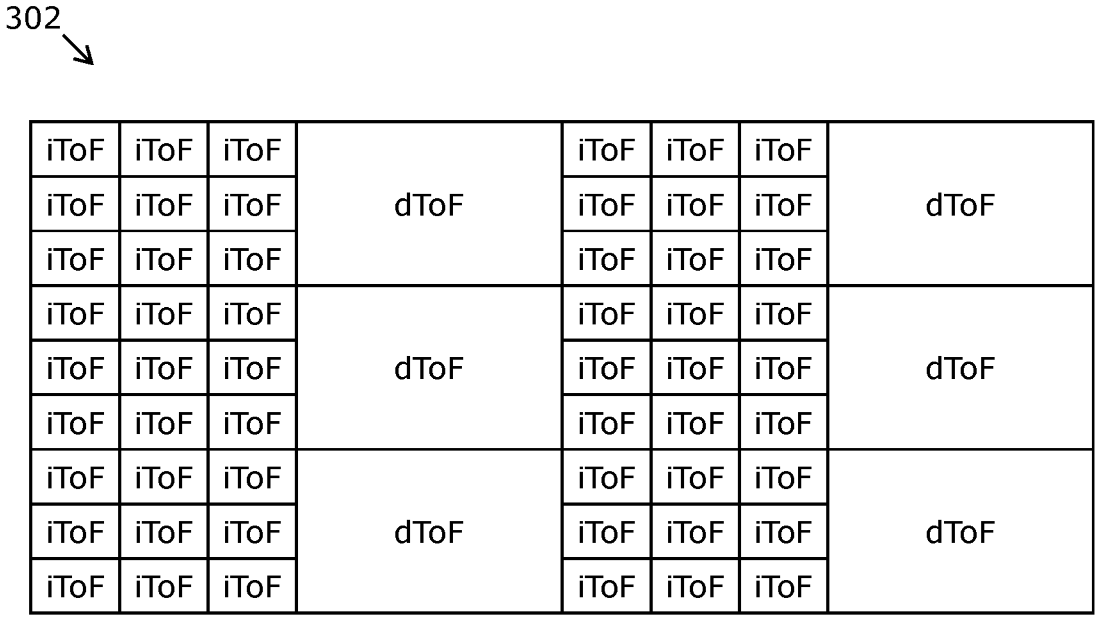
Figure 3C:
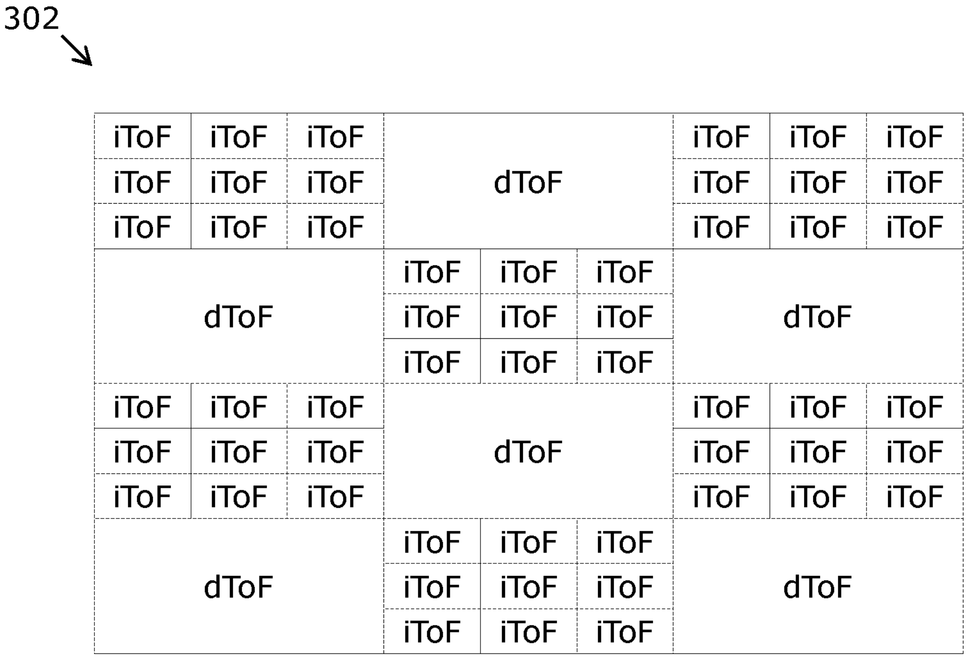

Referring to FIGS. 3A, 3B, and 3C, illustrated are different examples of arranging direct Time-of-Flight (dToF) pixels and indirect Time-of-Flight (iToF) pixels in a depth sensor 302, in accordance with various embodiments of the present disclosure. With reference to FIGS. 3A-3C, "iToF" refers to an iToF pixel in the depth sensor 302, and "dToF" refers to a dToF pixel in the depth sensor 302. For sake of simplicity and clarity, a part of the depth sensor 302 is shown to comprise 6 dToF pixels and 54 iToF pixels arranged in an interleaved manner across a part of a photo-sensitive surface of the depth sensor 302. It will be appreciated that, in an actual implementation, the photo-sensitive surface of the depth sensor would have millions of dToF pixels and iToF pixels. Moreover, a size of a given dToF pixel is assumed to be approximately thrice a size of a given iToF pixel. With reference to FIG. 3A, 3 consecutive rows of iToF pixels (wherein each row in the 3 consecutive rows comprises 9 iToF pixels) and 1 row of dToF pixels (wherein said 1 row comprises 3 dToF pixels) are shown to be arranged in an alternating manner. With reference to FIG. 3B, 3 consecutive columns of iToF pixels (wherein each column in the 3 consecutive columns comprises 9 iToF pixels) and 1 column of dToF pixels (wherein said 1 column comprises 3 dToF pixels) are shown to be arranged in an alternating manner. With reference to FIG. 3C, 1 dToF pixel and a set of 9 iToF pixels (depicted as a 3×3 array) are shown to be arranged in a horizontal direction and a vertical direction in an alternating manner (namely, in a chequered manner).

Figure 4A:
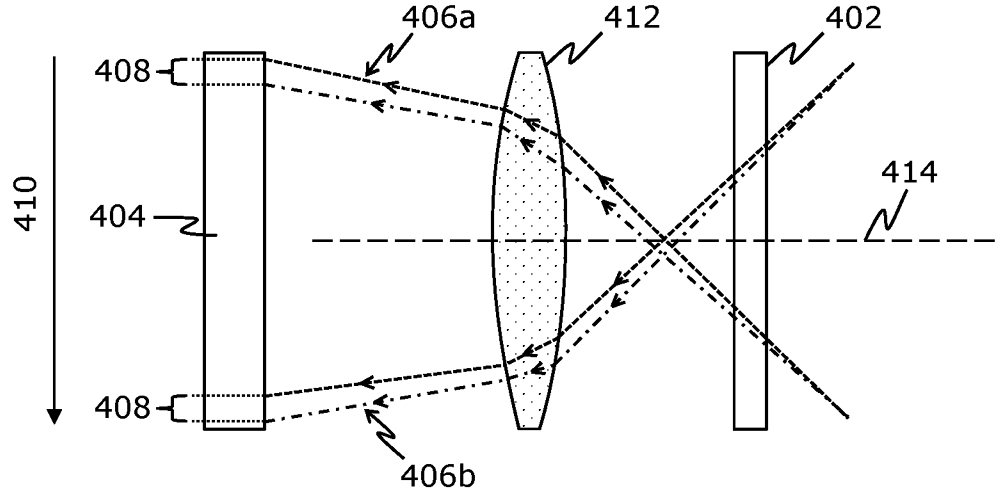
FIG. 4A illustrates how pixel shifting is performed by a wobulator when capturing a depth image and a next depth image using a depth sensor.
Figure 4B:
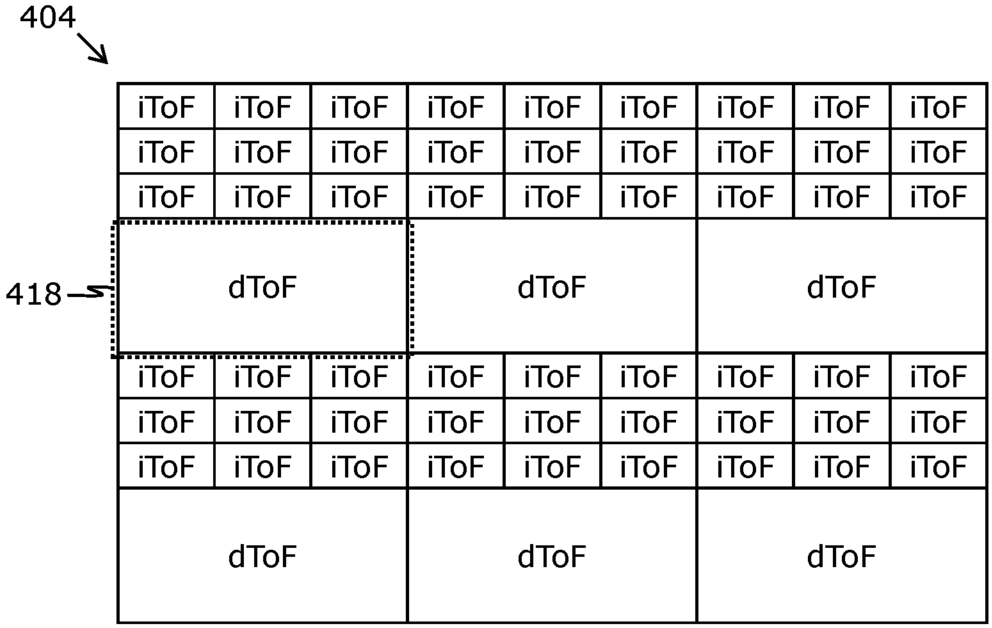
Figure 4C:
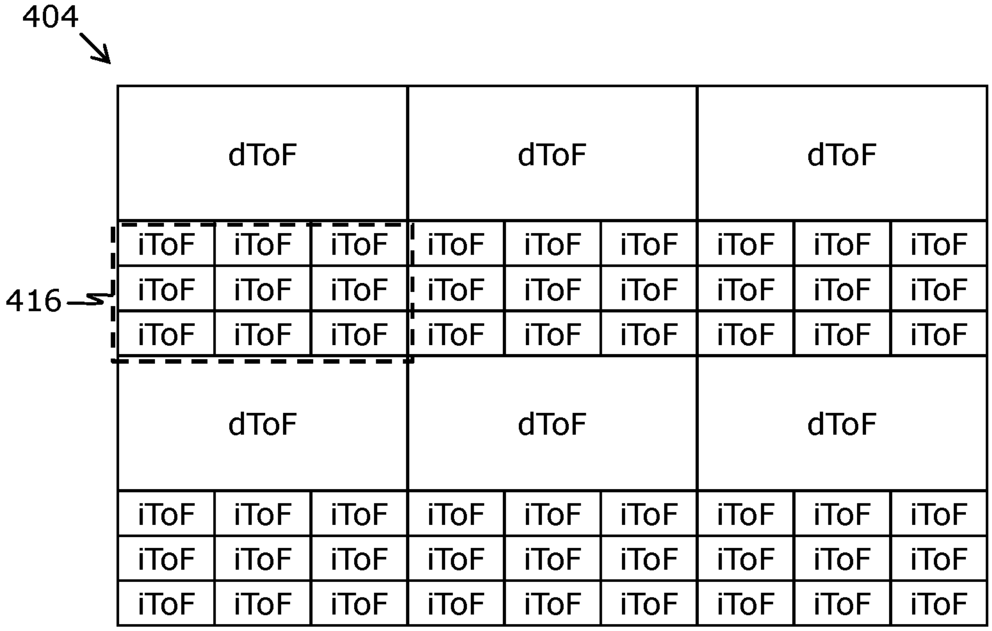
FIG. 4C illustrates how next dToF data and next iTOF data corresponding to the next depth image are obtained from the depth sensor, in accordance with an embodiment of the present disclosure.

Referring to FIGS. 4A, 4B, and 4C, FIG. 4A illustrates how pixel shifting is performed by a wobulator 402 when capturing a depth image and a next depth image using a depth sensor 404, FIG. 4B illustrates how direct Time-of-Flight (dToF) data and indirect Time-of-Flight (iToF) data corresponding to the depth image are obtained from the depth sensor 404, while FIG. 4C illustrates how next dToF data and next iTOF data corresponding to the next depth image are obtained from the depth sensor 404, in accordance with an embodiment of the present disclosure. With reference to FIGS. 4B-4C, "iToF" refers to an iToF pixel in the depth sensor 404, and "dToF" refers to a dToF pixel in the depth sensor 404.

With reference to FIG. 4A, the wobulator 402 is configured to perform the pixel shifting by optically steering an intensity-modulated light pulse (hereinafter referred to as "light pulse", for sake of convenience only) **406*a* (depicted using a dashed line with arrows) incoming towards the depth sensor 404 by a step size 408 in a vertically-downward direction 410. The light pulse 406*a* incident towards the depth sensor 404 after being reflected by objects in a real-world environment. Herein, the step size of the pixel shift is defined by a size of a (full) single dToF pixel. The depth image is captured when the light pulse 406*a* has not been shifted. For capturing the next depth image, the light pulse 406*a* is shifted by said step size 408 in the vertically-downward direction 410, and thus light pulse 406*b* (depicted using a dash-dot line with arrows) incident towards the depth sensor 404, for capturing the next depth image. The light pulses 406*a* and 406*b* also pass through optics 412 (for example, depicted as a lens) to reach the depth sensor 404. The wobulator 402 (for example, be implemented as a micro-electromechanical system (MEMS)-actuated soft polymer) is shown to be arranged along an optical axis 414 of said optics 412**.

With reference to FIGS. 4B and 4C, each of the dToF data and the next dToF data corresponds to 6 dToF pixels of the depth sensor 404, and each of the iToF data and the next iToF data corresponds to 54 iToF pixels of the depth sensor 404. Moreover, upon performing the pixel shifting in the aforesaid manner, it can be observed that the iToF data of a given set 416 of 9 iToF pixels (depicted using a dashed line box in FIG. 4C) corresponds to the dToF data of a given dToF pixel 418 (depicted using a dotted line box in FIG. 4B). Therefore, next optical depths for said 9 iToF pixels in the given set 416 can be determined, based on the iToF data corresponding to the given set 418*b* and an optical depth for the given dToF pixel 418, in order to mitigate depth-sensing range ambiguity associated with using iToF pixels. It will be appreciated that the optical depth for the given dToF pixel 418 can be easily and accurately determined, based on its corresponding dToF data (as obtained when the depth image was captured). The next depth image is generated from next optical depths of the 6 dToF pixels and next optical depths of the 54 iToF pixels, accordingly.

Figure 5:
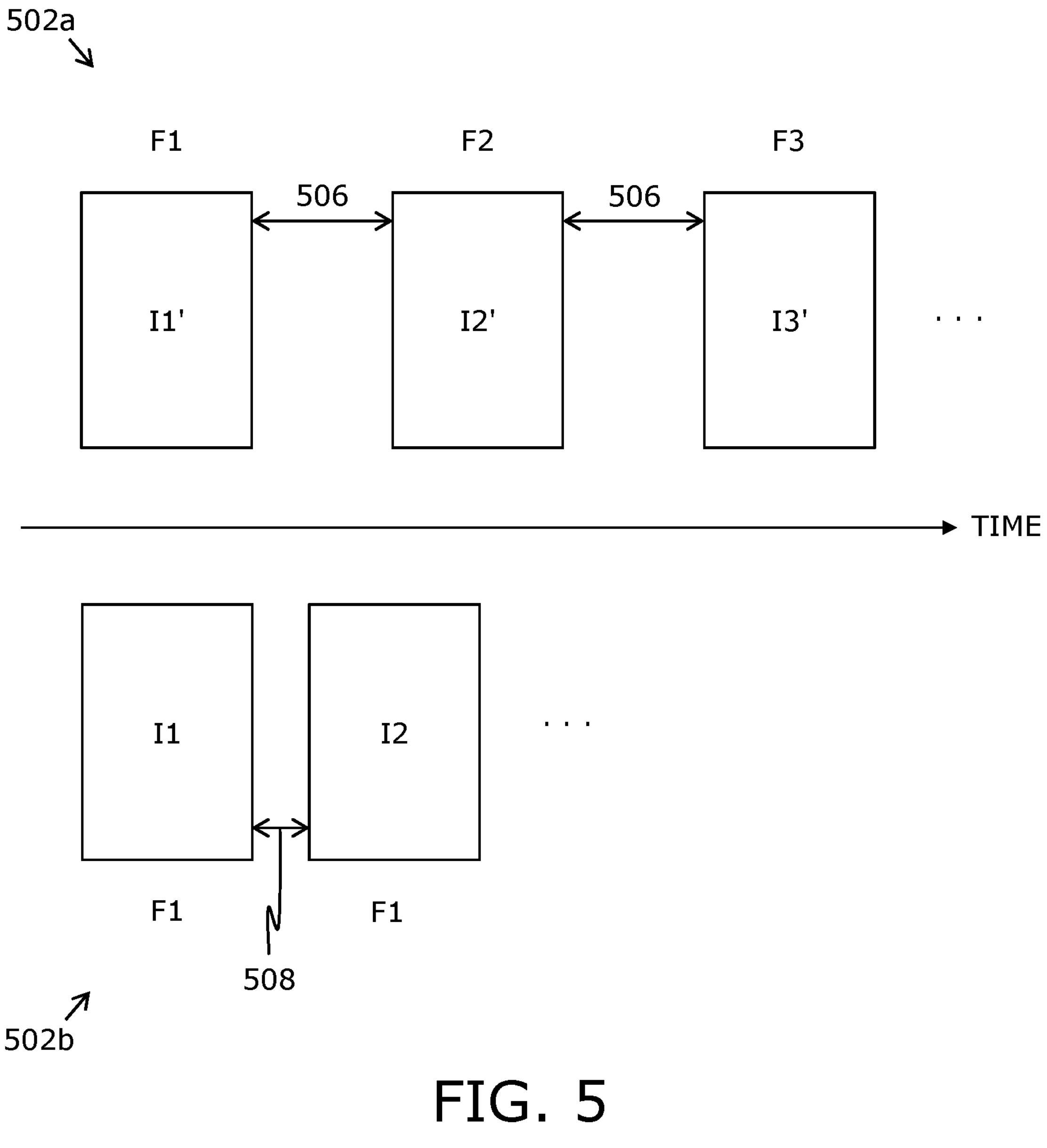
FIG. 5 illustrates a comparison between an exemplary scenario of generating depth images by employing a conventional depth sensor and an exemplary scenario of generating depth images by employing a depth sensor of the present disclosure.

Referring to FIG. 5, illustrated is a comparison between an exemplary scenario 502*a* of generating depth images by employing a conventional depth sensor and an exemplary scenario 502*b* of generating depth images by employing a depth sensor of the present disclosure. With reference to the exemplary scenario 502*a*, a sequence of the depth images generated using the conventional depth sensor with respect to time is shown, wherein the conventional depth sensor comprises indirect Time-of-Flight (iToF) pixels. For sake of simplicity and clarity, three depth images I1', I2', and I3' are shown to be captured at a first frequency F1, a second frequency F2, and a third frequency F3, respectively, using a light source that emits an intensity-modulated light pulse towards objects in a real-world environment. In the scenario 502*a*, in one cycle of, for example, 33 milliseconds (wherein an active time of the light source is 10 milliseconds, and a cooling time 504 of the light source is 23 milliseconds), only one depth image is being captured at a given frequency. This often results in a decreased frame rate of generating depth images.

With reference to the exemplary scenario 502*b*, a sequence of the depth images generated using the depth sensor of the present disclosure with respect to time is shown, wherein said depth sensor comprises direct Time-of-Flight (dToF) pixels and iToF pixels being arranged in an interleaved manner across a photo-sensitive surface of said depth sensor. For sake of simplicity and clarity, two depth images I1 and I2 are shown to be captured at a same first frequency F1, using a light source that emits an intensity-modulated light pulse towards objects in a real-world environment, and using a wobulator that performs a pixel shift 508 between the two depth images I1 and I2. The depth image I1 may be understood to be an initial (namely, a first) depth image, and the depth image I2 may be understood to be a next depth image. In the scenario 502*b*, in a same one cycle of 33 milliseconds (as described hereinabove in the scenario 502*a*), two depth images are being captured at a given frequency. Beneficially, this results in an increased frame rate of generating depth images, as compared to that in the scenario 502*a*.

FIGS. 3A-3C, 4A-4C, and 5 are merely examples, which should not unduly limit the scope of the claims herein. The person skilled in the art will recognize many variations, alternatives, and modifications of embodiments of the present disclosure.

The invention claimed is:

1. A depth imaging system comprising:
a light source;
a depth sensor comprising direct Time-of-Flight (dToF) pixels and indirect Time-of-Flight (iToF) pixels, wherein the dToF pixels and the iToF pixels are arranged in an interleaved manner across a photo-sensitive surface of the depth sensor; and
at least one processor configured to:
employ the light source to emit an intensity-modulated light pulse towards objects in a real-world environment;
obtain dToF data indicative of time taken by the intensity-modulated light pulse to reach the dToF pixels after being reflected by the objects;
obtain iToF data indicative of phase shifts undergone by the intensity-modulated light pulse upon reaching the iToF pixels after being reflected by the objects;
determine optical depths for the dToF pixels, based on the time taken by the intensity-modulated light pulse;
determine optical depths for the iToF pixels, based on the phase shifts undergone by the intensity-modulated light pulse and the optical depths for the dToF pixels, wherein the at least processor is configured to determine an optical depth for a given iToF pixel as an optical depth that is calculated based on a phase shift corresponding to the given iToF pixel and that lies within a predefined percent from an optical depth determined for a neighbouring dToF pixel; and
generate a depth image from the optical depths of the dToF pixels and the optical depths of the iToF pixels.

2. The depth imaging system of claim 1, wherein when determining the optical depth for the given iToF pixel, the at least one processor is configured to:
generate a histogram based on the optical depth determined for the neighbouring dToF pixel; and
fit the optical depth that is calculated based on the phase shift corresponding to the given iToF pixel into the histogram.

3. The depth imaging system of claim 1, wherein the optical depths for the iToF pixels are determined by using at least one neural network.

4. The depth imaging system of claim 1, further comprising a wobulator, wherein the at least one processor is configured to:
employ the light source to emit a next intensity-modulated light pulse towards the objects;
control the wobulator to perform a pixel shift between the depth image and a next depth image;
obtain next dToF data indicative of time taken by the next intensity-modulated light pulse to reach the dToF pixels after being reflected by the objects;
obtain next iToF data indicative of phase shifts undergone by the next intensity-modulated light pulse upon reaching the iToF pixels after being reflected by the objects;
determine next optical depths for the dToF pixels, based on the time taken by the next intensity-modulated light pulse;
determine next optical depths for the iToF pixels, based on the phase shifts undergone by the next intensity-modulated light pulse, wherein a next optical depth for a given iToF pixel is determined further based on at least one of: a next optical depth for a neighbouring dToF pixel, an optical depth in said depth image for a corresponding dToF pixel whose field of view overlaps with a field of view of the given iToF pixel; and generate the next depth image from the next optical depths of the dToF pixels and the next optical depths of the iToF pixels.

5. The depth imaging system of claim 4, the at least one processor is configured to utilise the depth image and the next depth image to generate a high-resolution depth image.

6. The depth imaging system of claim 4, wherein a step size of the pixel shift is any one of:

(i) a single dToF pixel, (ii) X dToF pixel, wherein X is a fraction that lies between 0 and 1, (iii) Y iToF pixels, wherein Y is an integer that lies in a range from 1 to Z, Z being equal to a number of iToF pixels that lie consecutively along a direction of the pixel shift in the depth sensor, (iv) W iToF pixels, wherein W is a decimal number having a whole number part that lies in a range from 1 to Z, and a decimal part that lies between 0 and 1.

7. The depth imaging system of claim 1, wherein M consecutive rows or columns of dToF pixels and N consecutive rows or columns of iToF pixels are arranged in an alternating manner, wherein M and N are integers, N being greater than M.

8. A method comprising:

employing a light source to emit an intensity-modulated light pulse towards objects in a real-world environment;

obtaining direct Time-of-Flight (dToF) data indicative of time taken by the intensity-modulated light pulse to reach dToF pixels of a depth sensor after being reflected by the objects, and obtaining indirect Time-of-Flight (iToF) data indicative of phase shifts undergone by the intensity-modulated light pulse upon reaching iToF pixels of the depth sensor after being reflected by the objects, wherein the dToF pixels and the iToF pixels are arranged in an interleaved manner across a photo-sensitive surface of the depth sensor;

determining optical depths for the dToF pixels, based on the time taken by the intensity-modulated light pulse;

determining optical depths for the iToF pixels, based on the phase shifts undergone by the intensity-modulated light pulse and the optical depths for the dToF pixels, wherein an optical depth for a given iToF pixel is determined as an optical depth that is calculated based on a phase shift corresponding to the given iToF pixel and that lies within a predefined percent from an optical depth determined for a neighbouring dToF pixel; and generating a depth image from the optical depths of the dToF pixels and the optical depths of the iToF pixels.

9. The method of claim 8, wherein the step of determining the optical depth for the given iToF pixel comprises:

generating a histogram based on the optical depth determined for the neighbouring dToF pixel; and fitting the optical depth that is calculated based on the phase shift corresponding to the given iToF pixel into the histogram.

10. The method of claim 8, wherein the step of determining the optical depths for the iToF pixels is performed using at least one neural network.

11. The method of claim 8, further comprising:

employing the light source to emit a next intensity-modulated light pulse towards the objects;

controlling a wobulator to perform a pixel shift between the depth image and a next depth image;

obtaining next dToF data indicative of time taken by the next intensity-modulated light pulse to reach the dToF pixels after being reflected by the objects;

obtaining next iToF data indicative of phase shifts undergone by the next intensity-modulated light pulse upon reaching the iToF pixels after being reflected by the objects;

determining next optical depths for the dToF pixels, based on the time taken by the next intensity-modulated light pulse;

determining next optical depths for the iToF pixels, based on the phase shifts undergone by the next intensity-modulated light pulse, wherein a next optical depth for a given iToF pixel is determined further based on at least one of: a next optical depth for a neighbouring dToF pixel, an optical depth in said depth image for a corresponding dToF pixel whose field of view overlaps with a field of view of the given iToF pixel; and generating the next depth image from the next optical depths of the dToF pixels and the next optical depths of the iToF pixels.

12. The method of claim 11, further comprising utilising the depth image and the next depth image to generate a high-resolution depth image.

13. The method of claim 11, wherein a step size of the pixel shift is any one of:

(i) a single dToF pixel, (ii) X dToF pixel, wherein X is a fraction that lies between 0 and 1, (iii) Y iToF pixels, wherein Y is an integer that lies in a range from 1 to Z, Z being equal to a number of iToF pixels that lie consecutively along a direction of the pixel shift in the depth sensor, (iv) W iToF pixels, wherein W is a decimal number having a whole number part that lies in a range from 1 to Z, and a decimal part that lies between 0 and 1.

14. A depth imaging system comprising:

a light source;

a depth sensor comprising direct Time-of-Flight (dToF) pixels and indirect Time-of-Flight (iToF) pixels, wherein the dToF pixels and the iToF pixels are arranged in an interleaved manner across a photo-sensitive surface of the depth sensor;

a wobulator; and at least one processor configured to:

employ the light source to emit an intensity-modulated light pulse towards objects in a real-world environment;

obtain dToF data indicative of time taken by the intensity-modulated light pulse to reach the dToF pixels after being reflected by the objects;

obtain iToF data indicative of phase shifts undergone by the intensity-modulated light pulse upon reaching the iToF pixels after being reflected by the objects;

determine optical depths for the dToF pixels, based on the time taken by the intensity-modulated light pulse;

determine optical depths for the iToF pixels, based on the phase shifts undergone by the intensity-modulated light pulse and the optical depths for the dToF pixels;

generate a depth image from the optical depths of the dToF pixels and the optical depths of the iToF pixels employ the light source to emit a next intensity-modulated light pulse towards the objects;

control the wobulator to perform a pixel shift between the depth image and a next depth image;

obtain next dToF data indicative of time taken by the next intensity-modulated light pulse to reach the dToF pixels after being reflected by the objects;

obtain next iToF data indicative of phase shifts undergone by the next intensity-modulated light pulse upon reaching the iToF pixels after being reflected by the objects;

determine next optical depths for the dToF pixels, based on the time taken by the next intensity-modulated light pulse;

determine next optical depths for the iToF pixels, based on the phase shifts undergone by the next intensity-modulated light pulse, wherein a next optical depth for a given iToF pixel is determined further based on at least one of: a next optical depth for a neighbouring dToF pixel, an optical depth in said depth image for a corresponding dToF pixel whose field of view overlaps with a field of view of the given iToF pixel; and generate the next depth image from the next optical depths of the dToF pixels and the next optical depths of the iToF pixels.

15. The depth imaging system of claim 14, the at least one processor is configured to utilise the depth image and the next depth image to generate a high-resolution depth image.

16. A method comprising:

employing a light source to emit an intensity-modulated light pulse towards objects in a real-world environment;

obtaining direct Time-of-Flight (dToF) data indicative of time taken by the intensity-modulated light pulse to reach dToF pixels of a depth sensor after being reflected by the objects, and obtaining indirect Time-of-Flight (iToF) data indicative of phase shifts undergone by the intensity-modulated light pulse upon reaching iToF pixels of the depth sensor after being reflected by the objects, wherein the dToF pixels and the iToF pixels are arranged in an interleaved manner across a photo-sensitive surface of the depth sensor;

determining optical depths for the dToF pixels, based on the time taken by the intensity-modulated light pulse;

determining optical depths for the iToF pixels, based on the phase shifts undergone by the intensity-modulated light pulse and the optical depths for the dToF pixels;

generating a depth image from the optical depths of the dToF pixels and the optical depths of the iToF pixels;

employing the light source to emit a next intensity-modulated light pulse towards the objects;

controlling a wobulator to perform a pixel shift between the depth image and a next depth image;

obtaining next dToF data indicative of time taken by the next intensity-modulated light pulse to reach the dToF pixels after being reflected by the objects;

obtaining next iToF data indicative of phase shifts undergone by the next intensity-modulated light pulse upon reaching the iToF pixels after being reflected by the objects;

determining next optical depths for the dToF pixels, based on the time taken by the next intensity-modulated light pulse;

determining next optical depths for the iToF pixels, based on the phase shifts undergone by the next intensity-modulated light pulse, wherein a next optical depth for a given iToF pixel is determined further based on at least one of: a next optical depth for a neighbouring dToF pixel, an optical depth in said depth image for a corresponding dToF pixel whose field of view overlaps with a field of view of the given iToF pixel; and generating the next depth image from the next optical depths of the dToF pixels and the next optical depths of the iToF pixels.

17. The method of claim 16, further comprising utilising the depth image and the next depth image to generate a high-resolution depth image.

* * * * *